Feb. 26, 1963 M. PHISTER, JR., ETAL 3,079,079
PROCESS AND CONTROL APPARATUS FOR IMPROVING
OPERATING EFFICIENCY
Filed May 21, 1958 3 Sheets-Sheet 1

MONTGOMERY PHISTER, JR
CHARLES G. LASPE
THOMAS M. STOUT
INVENTORS

BY

ATTORNEY

MONTGOMERY PHISTER, JR
CHARLES G. LASPE
THOMAS M. STOUT
INVENTORS

United States Patent Office 3,079,079
Patented Feb. 26, 1963

3,079,079
PROCESS AND CONTROL APPARATUS FOR IMPROVING OPERATING EFFICIENCY
Montgomery Phister, Jr., Palos Verdes Estates, Charles G. Laspe, Rolling Hills, and Thomas M. Stout, Redondo Beach, Calif.; said Phister and Laspe assignors to Thompson Ramo Wooldridge Inc., Cleveland, Ohio, a corporation of Ohio
Filed May 21, 1958, Ser. No. 736,880
5 Claims. (Cl. 235—151)

This invention relates to process control methods and apparatus for improving process operating efficiency, and more particularly, to methods for obtaining the best balance between the amount of products made, the quality of these products, and the cost of operating various parts of the process for making the products.

In a typical prior art control system, some combination of operators and control and measurement equipment is used to maintain proper process conditions by reading process instruments and making adjustments. The magnitude and direction of the adjustments are determined sometimes by equipment and sometimes by human judgment. In the case of adjustments made by equipment, the control rules are very simple ones, usually arranging that the adjustment be some definite algebraic or other function of the measurements. In the case of adjustments made by humans, the control rules are somewhat arbitrary and rely to a great extent on the judgment and experience of the individual. In some cases they rely on calculations made by the individual, or on calculations made elsewhere and interpreted or employed by the human. Because of the complexity of most modern processes, because of the frequency with which changes occur which should result in adjustments in the process, and because of the comparative unsophistication of the human-machine control system described above, processes are normally not operated in the best way. The result is that upsets occur, equipment is misused, production is lost, operating costs are high, or some combination of these and other bad effects occurs.

The present invention obviates the above disadvantages of the prior art by providing a control technique which may be operated at high speed to solve complex equations relating to quality of materials, cost of products, and amount of material that is processed (sometimes referred to as throughput). In particular terms, the invention contemplates the maximization of profit by controlling certain process variables to compensate for changes measured in other variables.

To effect the desired maximization of profit, the process is described in terms of three basic types of equations, which comprise what is sometimes called a mathematical model of the process. The first equation is referred to as the objective equation and defines the profit obtained from operating the process in terms of variables related to the process, such as flow rate of materials, and rate of use of fuel, value of materials, a conversion function which defines the amount of raw material converted to a final product. The second set of equations represents constraints in the operation of the process, such as flow rates (limited for instance by compressor or pump capacities) limitations on acceptable product quality, or market limitations on the desired quantity of the various products. The third set of equations defines the relationships between the process variable, such as the various interrelationships between conversion, yields, flow rate, efficiency, temperature, pressure, and chemical and physical properties.

Accordingly, it is an object of the present invention to provide a process control system for controlling adjustments in the operation of a process so that it is operated in the most economical fashion.

Another object of the invention is to obtain maximum operating efficiency in a process considering such factors as the amount of a product to be produced, the quality of the product, and the cost of operating various parts of the process.

A further object of the invention is to provide a method for process control which is adapted for high speed correction based on a mathematical model of the process.

Yet another object of the invention is to provide a method and appropriate apparatus for maximizing the profit or operating return which may be obtained in running a process.

Still another object of the invention is to provide a process control system which is adapted for rapidly adjusting the method of operation of a process on the basis of measurements made by transducing means employed in the system.

A specific object of the invention is to provide a method for operating a chemical process wherein the flow rate of materials must be regulated at various points in order to obtain a maximum profit.

Another specific object of the invention is to provide an automatic correlation of the conversion formula employed in controlling a chemical process in order to insure that the constants in the conversion equation accurately represent the conversion as it occurs in operation of the process.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figure 1:
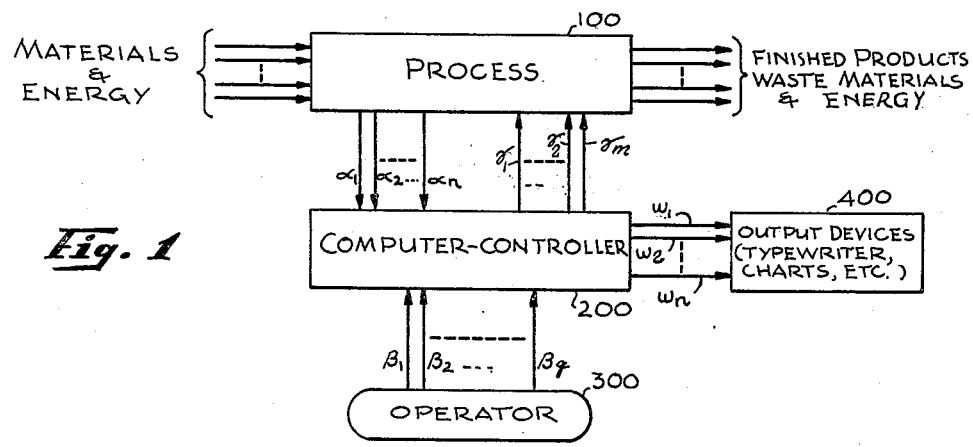
FIG. 1 is a block diagram of a general form of process control system provided by the invention.

Reference is now made to FIG. 1 wherein it will be noted that a process 100 receives certain materials and energy and produces certain finished products, waste material, and energy. The process is controlled by a computer controller 200 which receives certain input information $\alpha$ from the process and certain control signals $\beta$ from an operator 300 and produces control signals $\gamma$ for controlling the process and output signals $\omega$ to provide the operator with certain information about the process. Signals $\omega$ are applied to output devices 400.

Computer-controller 200 is arranged to compute the control relationships in accordance with the mathematical model of the system. The first equation defines the profit $P$ in terms of the following equation $$P = \sum_{i=1}^{i=n}(V_i - Cpo_i)fp_i - \sum_{j=1}^{j=m}(Cr_j + Cro_j)fr_j - \sum_{k=1}^{k=n}Coo_k$$

where $V_i$ = value of the $i$th product $Cpo_i$ = cost of operating the process which is proportional to the flow rate of the $i$th product $fp_i$, $fr_j$, $f_j$ = flow rate of the $i$th product, flow rate of the $j$th product, flow rate of the $j$th raw material $Cr_j$ = cost of the $j$th raw material $Cro_j$ = operating cost proportional to the flow rate of the $j$th raw material $Coo_k$ = other variable cost of operating the process It will be noted that time is not included as a variable in the above profit function except as it is inherent in the flow rates $fp_i$ and $fr_j$. It should be understood, therefore, that the profit equation may be construed to represent an instant of time, in which case profit is maximized for that instant only, or it may be construed to represent a profit function over a period of time. In the usual application of the invention, the maximum profit will be obtained by considering the various costs and values of materials and catalysts and the like over a typical operating period rather than an instant of time. The reason for this is that certain costs will vary as the particular material is used. For example, it may be possible to maximize profit at a present instant by utilizing a catalyst at a very high rate, but this present use may increase the average cost of operating the system due to the low efficiency rate of output when the catalyst has been somewhat depleted. Thus, in this case it is preferred to interpret the profit equation as defining an operation over a predetermined interval of time during which some average values and costs may be defined.

The second set of equations defines certain constraints for the system which will be illustrated in particular with respect to a chemical process below. In general, these constraints will specify certain boundaries for such variables as the flow rates in the system or the amounts of material which may be supplied. The third set of equations define the interrelationships between variables, a typical equation for conversion being considered below.

Figure 2:
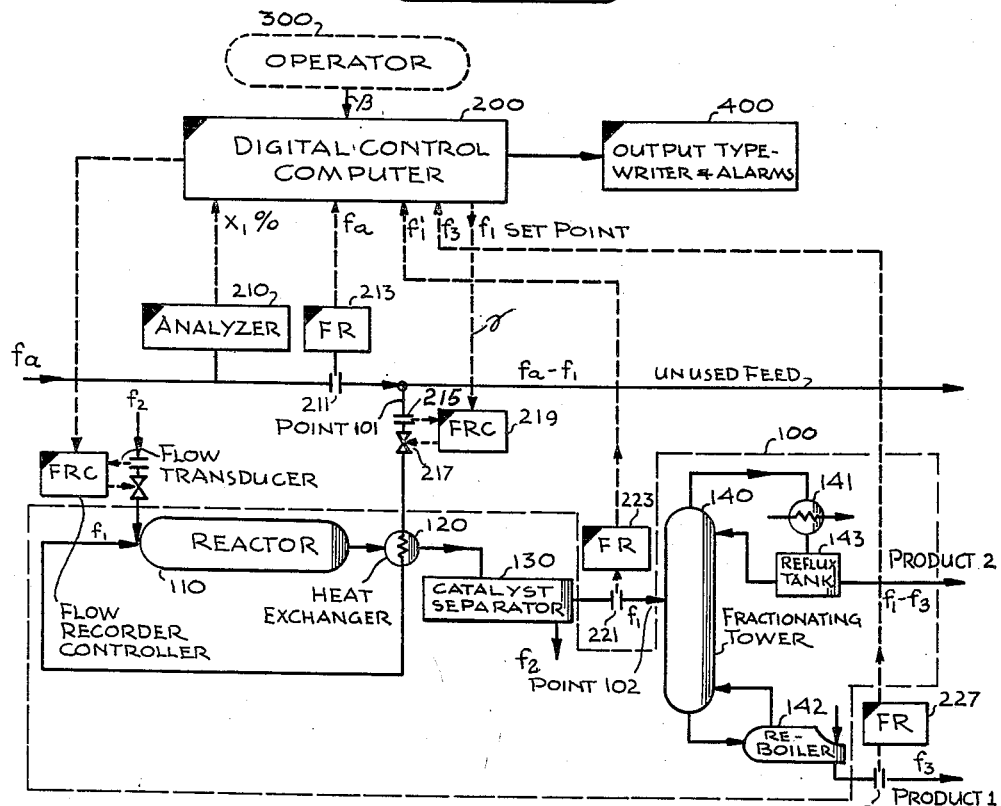
FIG. 2 illustrates a specific form of the system provided by the invention for maximizing profit in a chemical process.

The general technique of the invention can best be described with respect to a specific example indicated in FIG. 2. In this case process 100 is a chemical process utilizing, among other equipment, a reactor 110, a heat exchanger 120, a catalyst separator 130 and a fractionating tower 140. The raw material, a mixture containing $x_1\%$ of a primary reactant and $(1-x_1)\%$ of an inert material that does not enter into the reaction, enters at point 101 with a flow rate $f_1$ and proceeds through heat exchanger 120 which increases its temperature. The mixture then enters reactor 110 where a catalyst is added at flow rate $f_2$. The reaction is exothermic. The hot product leaves reactor 110, passes through heat exchanger 120 where it is cooled and the reactor feed is heated, and enters catalyst separator 130. After removal of the catalyst, the remaining material, consisting of inert substance, the product, and that part of the reactant not converted to product, passes point 102 and enters fractionating tower 140. Here the product is separated from the other components. The product leaves the process at rate $f_3$.

Associated with fractionating tower 140 is a condenser 141, a reboiler 142, and a reflux tank 143; the function of these components is to separate the output of tower 140 into products 1 and 2 which typically could be hydrocarbons with different boiling points. Product 1 is produced at an output flow rate of $f_3$ and product 2 is produced at an output flow rate of $f_1-f_3$.

Various measurements are made for controlling the process and corresponding signals are sent to computer 200. These signals are referred to as $\alpha$ signals to distinguish the group from those signals referred to as $\beta$ signals which are introduced into the computer by the operator. In particular, it will be noted that the input material is analyzed by an analyzer 210 producing a signal indicating the percent $x_1$ of the primary reactant. The input flow also passes through a transducer 211 associated with a flow recorder 213 producing a signal indicating the flow rate $f_a$ of the input material. This signal is applied to computer 200.

Examples of suitable types of analyzers which may be employed for the purpose of device 210 are found on pages 364 and 365 of the Chemical Engineering Catalogue of 1958 published by the Reinhold Publishing Co., 431 Park Ave., N.Y. Suitable flow-recorder controllers, recorders and valves are shown on pages 1506 A–D of this catalogue. The various transducers are standard equipment in the present practice of the art and therefore are not considered here as modifications specified by the instant invention.

After passing beyond transducer 211, the flow divides near point 101 with flow rate $f_a-f_1$ corresponding to unused feed.

Flow at rate $f_1$ then proceeds beyond transducer 215 and valve 217 to heat exchanger 120. Transducer 215 provides a signal for a flow-recorder controller 219 which also receives a control signal of the $\gamma$ type from computer 200 and produces a signal for actuating valve 217 to regulate the amount of flow $f_1$. Computer 200 also receives other $\alpha$ signals indicating the flow, as for example, the signal derived from transducer 221 associated with flow-recorder 223 measuring the flow $f_1$ to fractionating tower 140. The output flow rate $f_3$ is measured by transducer 225 and a corresponding signal is produced by flow recorder 227 and sent to computer 200.

Figure 4:
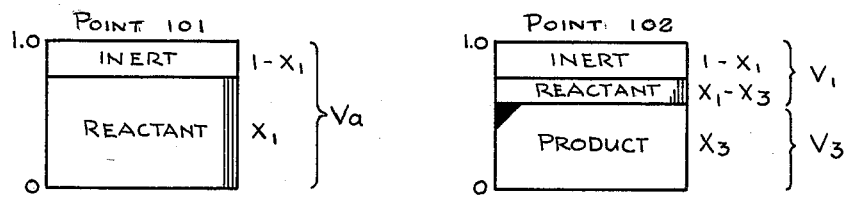
FIG. 4 is a chart indicating the composition of the process material at points 101 and 102 in the embodiment of FIG. 2.

The graphs of FIG. 4 indicate the relative amounts of the various components at the two process points 101 and 102. The process boundaries will be taken to be those indicated in FIG. 2. A study of the relationship between this process and the rest of the operation of the plant discloses the following boundary conditions: (1) Incoming material is available at instantaneous flow rate $f_a$, and contains $x_1$ percent of reactant. Both of these quantities are independent variables that may vary over wide ranges. Often there is more of this incoming material than the reactor can use, and whatever is not used will be employed elsewhere in the plant. (2) Product-flow rate $f_3$ can vary over a wide range without effect on the rest of the plant.

The objective is to obtain maximum operating profit from the operation of the unit. It will be assumed that maintenance costs are constant, unaffected by operation of the process. For this reason and because in general the operation of the unit from one minute to the next does not affect its operation in the future, the act of maximizing total operating profit is equivalent to maximizing the instantaneous profit derived from the unit. An expression for the profit objective follows:

$$P = f_1 x_3 V_3 + f_1(1-x_3)V_1 + (f_a-f_1)V_a - f_a V_a - f_2 V_2 - C$$
$$= f_1 x_3 (V_3-V_1) - f_1(V_a-V_1) - f_2 V_2 - C \quad (1)$$

where $x_3$ = weight percentage of desired product at point 102
$f_a$ = flow rate of incoming material
$f_1$ = flow rate of material at points 101 and 102
$f_1 x_3$ = flow rate of product at point 102
$V_3$ = value of desired product at point 102
$V_1$ = value of that material at point 102 which is not product
$V_a$ = value of raw material, if not processed in this unit
$f_2$ = flow rate of catalyst
$V_2$ = loss in value of catalyst in process
$C$ = constant operating costs The effect of heat losses on cost is negligble. The catalyst, on the other hand, is very expensive and is one of the major costs of operation.

The independent variables are the incoming flow rate $f_a$ and $x_1$, not susceptible to control. The only product variable is $x_3$, the concentration of the desirable product in the output of the catalyst separator. The intermediate variables are $f_1$ and $f_2$, the flow rates of raw material and catalyst into the reactor, respectivley. Other important intermediate variables are reactor temperature and pressure, catalyst-separator level, and fractionating-tower operating conditions. In the existing installation, the catalyst separator provides the bottleneck on unit capacity and determines the upper limits on the intermediate variables $f_1$ and $f_2$. The total flow into the separator amy not exceed $f_{max}$, and the catalyst flow rate may not exceed $f_{2\ max}$. Or $$f_1 + f_2 \leq f_{max}$$
$$f_2 \leq f_{2\ max} \quad (2)$$

These equations comprise the constraint equations for this process.

The operation of the reactor is generally specified by quoting a "conversion" for the reactor, defined as the ratio of the amount of desired product at point 102 to the amount of that raw material at point 101 which theoretically could have been converted entirely to desired product. If this is expressed as $c = x_3/x_1$, $x_3$ can be replaced in Equation 1 by $cx_1$, obtaining $$P = f_1 c x_1 (V_3 - V_1) - f_1 (V_a - V_1) - f_2 V_2 - k \quad (3)$$

Conversion is known to be a function of reactor temperature and pressure, catalyst flow, and feed flow. The temperature and pressure variations are such that ideal operation is clearly at the maximum safe temperature and pressure ratings of the process equipment. Conversion is also known to increase with catalyst-flow rate.

In the system illustrated, reactor temperature and pressure are controlled at their desired maximums by conventional recorders and controllers. The separation of feedstock flow into reactor feed and by-pass feed, and the ratio of catalyst-feed rate to reactor-feed rate is controlled by an operator, who adjusts the two flow rates compatible with process limitations and with the established boundary conditions.

The dynamics of the process (the variation in output parameters as a function of time with variations on the independent and operating variables) are largely unknown. Experience indicates that a change in flow at the input to the reactor reaches its final value at the fractionating-tower feed about 15 minutes later, and at the fractionating-tower output about 45 min. later.

A theoretical analysis of the kinetics of the reaction and of the relationship between all process variables proves impossible. However, a careful study of the available operating data on conversion and on the relationship between feed-flow rate, catalyst-flow rate, and conversion makes it possible to establish certain correlations between these variables and to write a mathematical expression relating them that provides the best possible fit to available operating data. In the equation below expressing this mathematical relationship, constants $k_1$, $k_2$, and $k_3$ are chosen to make this curve best fit on typical data.

$$c = \frac{k_2 f_2}{1 + k_3 f_2} e^{-k_1 f_1} \quad (4)$$

Figure 5A:
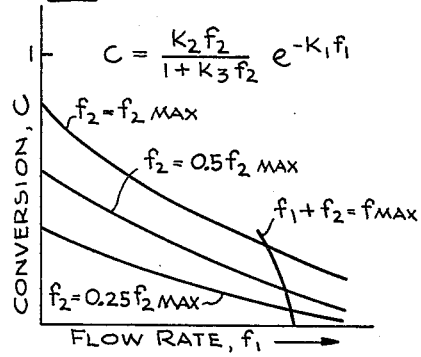
FIGS. 5a and 5b are graphs showing various curves of conversion versus flow rate for the embodiment of FIG. 2.

Equation 4 constitutes an example of the third type of equation for this process indicating the interrelation of variables. This equation for $c$ is plotted in FIG. 5, wherein the maximum values for catalyst-flow rate and for combined catalyst- and feed-flow rates are also indicated.

Figure 5B:
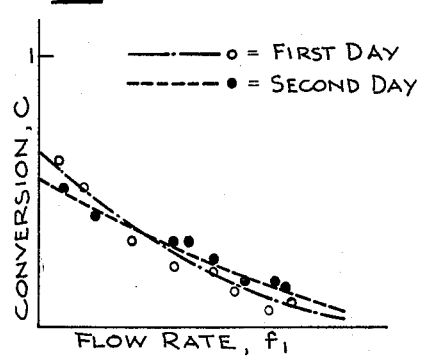

Unfortunately, Equation 4 does not exactly describe the effect of all variables on conversion. In particular, there is reason to believe that unpredictable and unidentifiable factors tend to shift the conversion curves from one day to another and even from one eight-hour period to another. A typical set of operating points taken on two different days is shown in FIG. 5b, and the curve of Equation 4 is fitted to each set of points by suitably choosing parameters $k_1$, $k_2$, and $k_3$.

Reviewing his collection of data at this point, the system designer can make the following statements: the objective of any control system is to maximize the operating profit function P of Equation 3; in Equation 3 the initial percentage of reactant in the feed ($x_1$) is an independent variable beyond control; the conversion $c$ is a function of $f_1$ and $f_2$ whose more general form is indicated by Equation 4; the two flow rates $f_1$ and $f_2$ are the intermediate variables subject to control; the physical characteristics of the process equipment set upper limits on these flow rates, Equation 2.

The control problem is now specified in enough detail so that the designer can see how it might operate. The data must be used to evaluate constants $k_1$, $k_2$, and $k_3$ of Equation 4 and provide a good fit of the curves to that data. With these constants determined, there are particular values of $f_1$ and $f_2$ which maximize the profit of Equation 3 for every value of reactant concentration $x_1$ (see Equations 5 and 6 below). In its simplest form, the control system must therefore measure $x_1$; must calculate the appropriate values of $f_1$ and $f_2$; and must adjust the corresponding flow-control valves in the process.

The control system will, however, be complicated by several other afctors. First, it may be that there is not enough feed available to obtain maximum theoretical profit from the operation. Second, the optimum values of $f_1$ and $f_2$ may be such that the capacity of process equipment is exceeded. Finally, the control system must continually make sure that the functional relationship it uses to relate conversion with catalyst and feed flow rates, Equation 4, accurately represents plant conditions at the time.

To control the process, a computer must first find the maximum value for P of Equation 3, subject to the restriction that conversion $c$ is a function of $f_1$ and $f_2$ as shown in Equation 4. Substituting Equation 4 in Equation 3, then taking the partial derivative of P with respect to $f_1$, and setting it equal to zero, $$c(1 - k_1 f_1) = \frac{V_a - V_1}{x_1 (V_3 - V_1)} \quad (5)$$

Similary, setting the partial derivative of P with respect to $f_2$ equal to zero, $$\frac{f_1 c}{f_2 (1 + k_3 f_2)} = \frac{V_2}{x_1 (V_3 - V_1)} \quad (6)$$

The reactant feed concentration $x_1$ of Equations 5 and 6 is measured every time new values for $f_1$ and $f_2$ are to be determined. All of the other constants in Equations 5 and 6, and Equation 4 (which relates conversion to the unknown quantities) are known. Therefore, the computer must solve Equations 5 and 6 simultaneously for the flow rates $f_1$ and $f_2$, after substituting $c$ from Equation 4. The result will be the optimal values for flow, which will be called $f_{10}$ and $f_{20}$.

The computer must now determine whether the optimal flow rates are obtainable in practice, and must determine what flow rates should actually be used if they are not. The effect of process limitations is most easily understood with reference to FIG. 6, wherein contours representing equal values of P in the $f_1 f_2$ plane are plotted. Because of the nature of Equations 3 and 4, there is only one point of maximum profit, represented by the coordinates ($f_{10}$, $f_{20}$). Equipment limitations are represented by the straight lines, $$f_2 = f_{2\ max} \quad (7)$$
$$f_1 + f_2 = f_{max} \quad (8)$$

and the feed-availability limitation is represented by the single straight line $$f_1 = f_a \quad (9)$$

Figure 6A:
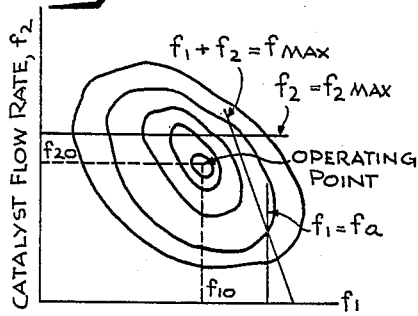
FIGS. 6a and 6b are plots of lines of constant profit for the embodiment of FIG. 2.

As long as the coordinates of the maximum-profit lie to the left of and below the lines defined by Equations 7, 8, and 9, the process flow rates $f_1$ and $f_2$ should be set at the optimum values $f_{10}$ and $f_{20}$, FIG. 6a. However, if any one of the three inequalities of Equations 2 and 10, namely:

$$f_2 \leq f_{2\,max} \quad (2)$$

$$f_1 + f_2 \leq f_{max}$$
$$f_1 \leq f_a \quad (10)$$

is not satisfied, the optimum flow rates cannot be used. Note that the lines defined by Equations 7 and 8 are fixed, but that the line defined by Equation 9 shifts from time to time as feed availability varies. Furthermore, the coordinates of the optimum point will also shift as $x_1$ and conversion equation constants $k_1$, $k_2$, and $k_3$ vary.

Figure 6B:
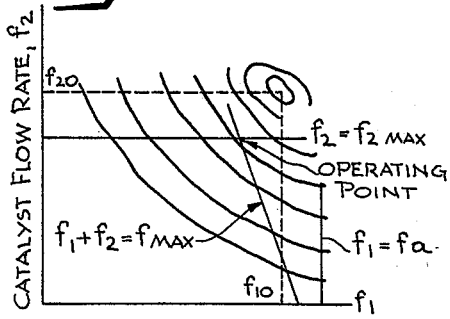

Some procedure must be specified for enabling the computer-control system to find the best settings for $f_1$ and $f_2$, when one or more of the inequalities of Equations 2 and 10 are not satisfied, as in FIG. 6b. The procedure to be followed may be based on the fact that, for the simple profit function of Equation 3, the realizable maximum profit will always lie on one of the lines, Equations 7, 8, or 9, if one or more of Equations 2 and 10 are not satisfied. With this in mind, the following procedure may be recognized for finding the proper operating point when the optimum operating point cannot be reached.

(1) If $f_a \geq f_{max}$

Find the maximum value of P from Equation 3 along the line $f_1 + f_2 = f_{max}$, with $0 \leq f_2 \leq f_{2\,max}$.
Find the maximum value of P along the line $f_2 = f_{2\,max}$ with $0 \leq f_1 \leq f_{max} - f_{2\,max}$.
Compare these two values of P. The process flow rates should be set at the $f_1$ and $f_2$ coordinates corresponding to the larger P.

(2) If $f_{max} - f_{2\,max} < f_a < f_{max}$

Find the maximum value of P along the line $f_1 = f_a$ with $0 \leq f_2 \leq f_{max} - f_a$.
Find the maximum value of P along the line $f_1 + f_2 = f_{max}$ with $f_{max} - f_a < f_2 \leq f_{2\,max}$.
Find the maximum value of P along the line $f_2 = f_{2\,max}$ with $0 \leq f_1 < f_{max} - f_{2\,max}$.
Compare these three values of P. The process-flow rates should be set at the $f_1$ and $f_2$ coordinates corresponding to the largest P.

(3) If $f_a = f_{max} - f_{2\,max}$

Find the maximum value of P along the line $f_1 = f_a$ with $0 \leq f_2 < f_{2\,max}$.
Find the maximum value of P along the line $f_2 = f_{2\,max}$ with $0 \leq f_2 < f_a$.
Compare these two values of P. The process flow rates should be set at the $f_1$ and $f_2$ coordinates corresponding to the larger P.

When the digital control system has calculated the appropriate best values for $f_1$ and $f_2$, and has taken action to assure that the chosen flow rates are adjusted to the process, it must modify the constants of Equation 4 so as to make sure that the resulting curve is as accurate a prediction as possible of the relationships between conversion, $f_1$ and $f_2$. The digital control system does this by taking a measurement of conversion periodically, and relating the measured value to previously set values for $f_1$ and $f_2$, taking into account whatever delay exists in the process between the time a flow-rate adjustment is made at the reactor input, and the time the resulting change in conversion is measured. The digital-control system will be required to keep a record of the average of such measurements over the past 10 hours. The computer thus has a list of 20 sets of three numbers each ($f_1$, $f_2$, and $c$) and it must find $k_1$, $k_2$, and $k_3$ such that these 20 points provide a best fit for the resulting curve. If the 20 points are labeled $c_i$, $f_{1i}$, $f_{2i}$ ($i = 1, 2, 3, \ldots 20$) then $k_1$, $k_2$, and $k_3$ may be evaluated by minimizing the following function with respect to the three variables.

$$D = \sum_{i=1}^{i=20} \left[ c_i - \frac{k_2 f_{2i}}{1 + k_3 f_{2i}} e^{-k_1 f_{1i}} \right]^2 \quad (11)$$

It will be observed that the curve-fitting operation of Equation 11, which is designed to take into account slow and unpredictable changes in the conversion-flow relationship, will be most effective only if fairly wide variations in $f_1$, $f_2$ and $c$ occur over a period of ten hours. Putting it another way, it is meaningless to fit the curve of Equation 4 to a set of 20 points all clustered together in a small area of FIGURE 5b. Such a cluster would occur if, over a period of 10 hours or more, there was little or no variations in $x_1$ and $f_a$ did not get lower than $f_{10}$.

One way to avoid this cluster is to require the control system to perturb the process occasionally, if process conditions do not themselves cause a perturbation. In other words, the variables $f_1$ and $f_2$ may be set at arbitrary points some distance from their ideal values long enough for the conversion corresponding to those flow rates to be measured. A probably better way is to let the curve-fitting operation depend not only on the 20 most recent process points, but also on previous values of $k_1$, $k_2$, and $k_3$.

The control system whose rough characteristics are now emerging clearly meets process objectives and no limitations on equipment capacity are exceeded. It now must be explained how the necessary process variables are to be measured and controlled and how the dynamics of the process are to be taken into account.

The principal process variables which must be measured are $f_a$, the available feed rate; $x_1$, the percentage of the reactant in the feed; and conversion, which may be computed if $x_1$ and $x_3$ are known. There is no difficulty involved in measuring $f_a$. Flow measuring devices are widely used and are cheap and reliable. The measurement of stream composition is more difficult. There is a continuous analytical instrument available which can measure the concentration of the reactant in the feed stream, but no instrument is available to measure product concentration in the fractionating-tower feed (point 102) or to measure the remaining reactant concentration in that feed.

Product concentration $x_3$ can be found by measuring the flow rate of material into the fractionating tower and the flow rate at the tower bottom, and dividing the second by the first. This rough value for $x_3$ may be refined somewhat by noting that the fractionating tower is normally operated so that some fixed percentage of the product appears at the tower top, regardless of tower-feed composition. If, for example, this particular tower is operated so that 5 percent of the distillate-flow rate is product, while approximately 90 percent of the residue is product, then $x_3$ can be found as follows:

$$f_1 x_3 = 0.05(f_1 - f_3) + 0.9 f_3$$

$$x_3 = 0.85 \frac{f_3}{f_1} + 0.05 \quad (12)$$

where $f_3$ = flow rate of product from fractionating system, and
$f_1$ = tower-feed rate So far, no mention has been made of the frequency with which measurements and computations are to take place. It is now necessary to specify these frequencies and to discuss how they will react on the control system and on the process. First, adjustments will be made in $f_1$ and $f_2$, as often as it is possible to measure the reactant concentration, and to carry out the calculations necessary to find $f_1$ and $f_2$. These calculations are not dependent upon measurements made later in the process, and there can therefore be no instability due to feedback. The modifications to Equation 4, on the other hand, will be carried out much more infrequently and will be based upon data accumulated over a long period of time. Specifically, one value of conversion will be obtained every half-hour by averaging instantaneous samples of flow rates and of reactant percentages over that period of time. To each value of conversion so obtained, appropriate average value of $f_1$ and $f_2$ will be determined. These three numbers, together with the corresponding numbers for the 19 previous half-hourly intervals are employed in Equation 11 to determine $k_1$, $k_2$ and $k_3$. Adjustments in these $k$ values thus take place very slowly, being affected only by data obtained over a long period of time. It is at this point that feedback is introduced into the control system. However, the feedback is smoothed and delayed to such an extent that it will not upset the dynamic equilibrium of the process.

The principal control system components required are a new instrument for the measurement of $x_1$, the reactant composition, and the digital control computer itself. The system designer's study of the required computer program must be extensive enough to allow him to specify computer precision, speed and memory capacity required. The number and type of input and output transducers and lines must also be specified.

Figure 3:
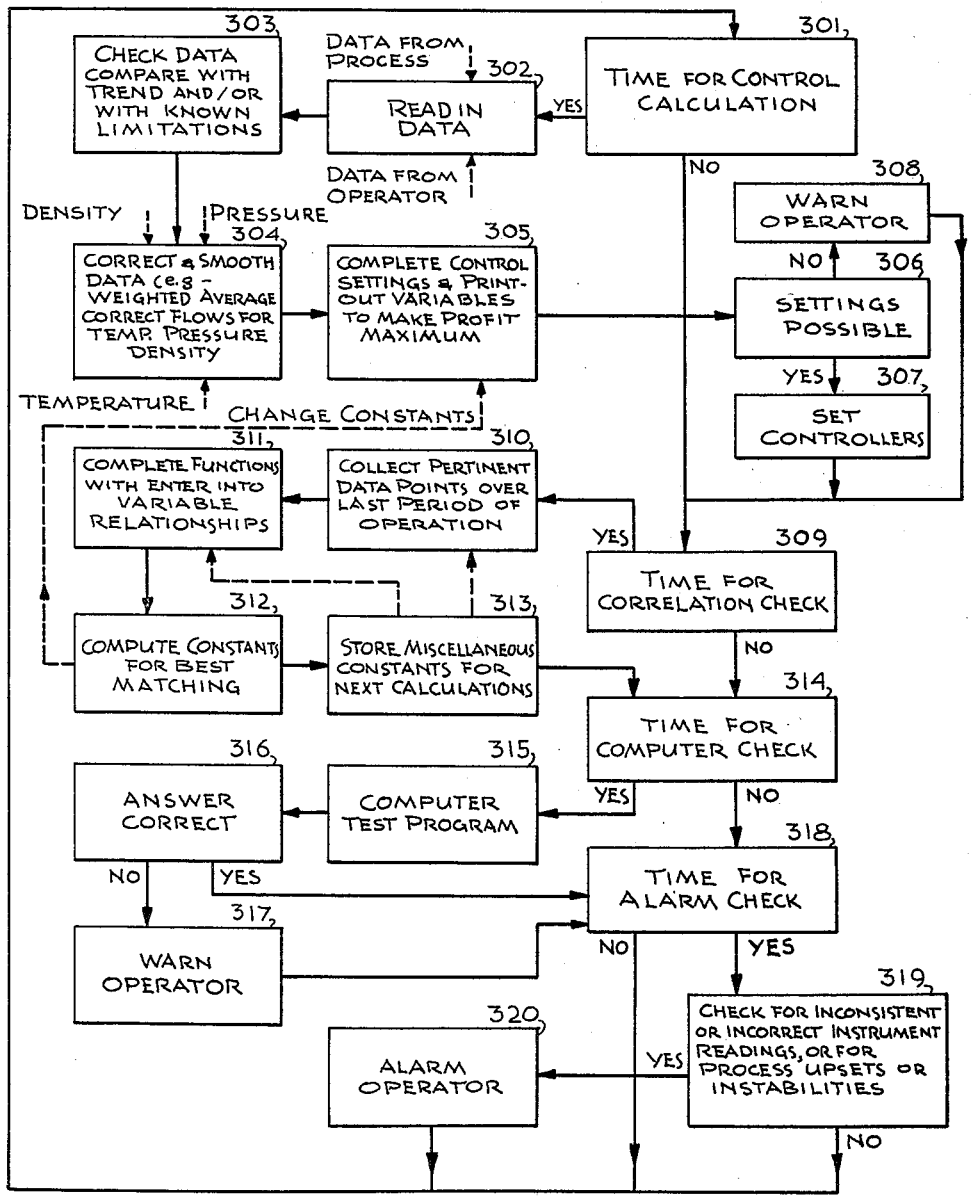
FIG. 3 illustrates a typical general method of operation which may be employed in the use of the invention.

Reference is now made to FIG. 3 where a diagram is shown indicating various computing operations which are performed in order to control a process in accordance with the method of the invention. As indicated in FIG. 3 the control process is continuous and may be entered at any point, there being various tests to determine whether the time for any particular operation is appropriate. For convenience, it will be assumed that we are presently considering the possibility of a control calculation in step 301. This determination results in an answer of either "yes" or "no." In the case of a "yes" answer the system then proceeds in step 302 to read in data indicated by dotted lines to be either $\alpha$ data of the type described above from the process or $\beta$ data representing operator's instructions, etc.

After the data read-in step 302, this data is then checked in step 303 by comparing the data with a previous trend and/or with known limitations. In step 304 the data is corrected and smoothed and weighted averages may be obtained to correct for flows, temperature, pressure, and density. In step 305 the desired control function is computed and variables may be generated. After this, a determination is made as to whether or not the control settings are possible, in step 306; if so, the various controllers are set in step 307. If not, a warning is given the operator in step 308.

Following the completion of the control calculation and setting a determination is made as to whether or not a correlation check may be made. Actually, this check may be made in a different sequence or perhaps even simultaneously with the above-mentioned calculation. However, for the purpose of the present example, it will be assumed that this check is made following the control calculation. If the time is proper for the correlation check, as indicated in step 309, the system proceeds with step 310 during which pertinent data points are analyzed over a previous period, and in step 311 various functions are computed on the basis of variable relationships. In step 312, then, the constants which had previously been assumed for the computing step 305 are re-evaluated to provide the best matching. Here the Equation 11 mentioned above may be employed. Following step 312, step 313 may be employed to store miscellaneous constants for the next calculation and then a check is made to see if it is the proper time to check the computer in step 314. If the time is proper, a computer test program is performed in step 315 which, if giving an answer of "yes," as to proper operation in step 316, proceeds no further, but if the answer is "no" a warning signal is generated in step 317 to indicate to the operator the particular error. Following the computer test program a time determination is made in step 318 as to the appropriateness of a check on the transducers. This is referred to as an alarm check. If the time is proper, step 319 is employed to check the various transducers. If the check is indicated to be negative an alarm is given in step 320, otherwise the system proceeds to return to the first step in control calculation, namely, step 301, for another cycle.

The computing program illustrated in FIG. 3 is intended only as a general guide for developing a particular control solution. A specific computing program will now be developed for the control problem of FIG. 2.

During the first phase of the program the computer must be controlled to solve Equations 5 and 6 above to determine the optimum values for $f_1$ and $F_2$. For convenient reference these equations are repeated as follows:

$$c(1-k_1 f_1) = \frac{V_a - V_1}{x_1(V_3 - V_1)} \quad (5)$$

$$\frac{f_1 c}{f_2(1+k_3 f_2)} = \frac{V_2}{x_1(V_3 - V_1)} \quad (6)$$

$$c = \frac{k_2 f_2}{1+k_3 f_2} e^{-k_1 f_1} \quad (4)$$

While many solution approaches are possible, the example here will assume that trial values for $f_1$ are substituted into Equation 5 to solve for a trial $f_2$ which is then substituted into Equation 6 with the corresponding trial value for $f_1$. Before beginning the computing operation the expected range of functions $e^{-k_1 f_1}$ are entered into the computer memory so that the multiplication of $k_1$ by the trial $f_1$ can be translated into the exponential value by reading out the corresponding function from a memory location specified by the exponent. If the trial values of $f_1$ and $f_2$ substituted into Equation 6 provide a solution the first phase of the computing is completed, otherwise a new trial value for $f_1$ is entered into Equation 5 and the resulting trial $f_2$ and $f_1$ are then entered into Equation 6 for checking. This process is continued until the optimum values for $f_1$ and $f_2$ are found. Trial $f_1$ values may be obtained by programming the computer adder to add one in the smallest unit denomination to the previous $f_1$.

The specific computing sequence for determining trial $f_2$ from trial $f_1$ may be specified as follows: $R_1 = V_3 - V_1$; $R_2 = x_1 R_1$; $R_3 = V_2/R_2$; $R_4 = Va - V_1 R_5 = R_4/R_2$; $R_6 = k_1 f_1$; $R_7 = e^{-R_6}$ from memory $f_2 = R_5/[k_2 R_7(1-R_6) - k_3 R_5]$.

The check on the trial values according to Equation 6 may be performed as follows: $R_8 = 1 + k_3 f_2$; $R_9 = (R_8)^2$; $R_{10} = f_2 \cdot R_9$ check: $f_1 f_2 k_2 R_7 / R_{10} = R_3$ When the equality check above verifies the optimum values for $f_1$ and $f_2$ the computing system is then ready for the second phase of the program, the checking of the constraints. These are illustrated for the embodiment of FIG. 2 in Equations 2 and 10 repeated here for convenience as follows:

$$f_2 \leq f_{2\,max} \quad (2)$$

$$f_1 + f_2 \leq f_{max}$$
$$f_1 \leq f_a \quad (10)$$

The computer is programmed to perform these comparisons and to set $f_1$ and $f_2$ at the optimum values if all constraints are satisfied. If any constraint is not complied with three possible computing routines are possible as outlined above. If $f_a \leq f_{max}$, the best setting for $f_2$ is found by substituting $f_2 - f_{max}$ for $f_1$ in Equation 6 and solving for $f_2$. This may be performed as a new computation or may be arranged to use the previous computation for trial $f_1$ and $f_2$, the results of which may be stored in the computer memory in addresses specified by $f_1$, or $f_2$ or both. This substitution provides the solution for the best value for $f_2$ to maximize the profit function P along the line $f_1 + f_2 = f_{max}$.

A similar computation must then be performed along the line $f_2 = f_{2\,max}$ by solving Equation 5 with $f_{2\,max}$ substituted for $f_2$, to provide a value for $f_1$. The values for these two constrained sets of values for $f_1$ and $f_2$ must be compared to respective constraints $f_2 \leq f_{2\,max}$ and $f_1 \leq f_{max} - f_{2\,max}$. If they are both permitted the selection is then made by solving profit Equation 3 to determine which provides the maximum profit.

If either of the constrained computations provides values for flow which still exceed the respective constraints the maximum value for the flow rate within the constraint area should be selected. Thus, if the solution for $f_2$ along the line $f_1+f_2=f_{max}$ provides a maximum profit value for $f_2$ which is greater than $f_{2\,max}$, $f_{2\,max}$ would be the value selected. If the result was negative $f_2=0$ would be selected.

If the input flow rate $f_a$ is less than $f_{max}$ and greater than $f_{max}-f_{2\,max}$ the maximum value for P should be determined along all of the boundary lines $f_1=f_a$; $f_2=f_{2\,max}$; and $f_1+f_2=f_{max}$. The best value for $f_1$ or $f_2$ in each of these cases can again be determined by solving the derivative Equation 5 or 6. The values are then compared to respective constraint conditions outlined above and finally all P values are computed from Equation 3 and compared to provide the best flow rates in view of the constraints.

The last possible input flow condition where $$f_a \leq f_{max} - f_{2\,max}$$

is determined in a similar manner along the lines $f_1=f_a$ and $f_2=f_{2\,max}$.

The program control procedure thus far may be summarized in outline form as follows:

I. Determine optimum settings for $f_1$ and $f_2$ for maximum profit without considering constraints
 A. Solve for trial values of $f_2$ using trial $f_1$ values
$$f_2 = R_5/[k_2 R_7(1-R_6) - k_3 R_5]$$
 B. Check trial $f_1$ and $f_2$
$$f_1 f_2 k_2 R_7 / R10 = R_3$$
 C. Continue trials and checks until check equation is satisfied II. Check constraint equations and recompute along constraint lines to find maximum profit if optimum settings of $f_1$ and $f_2$ are not permissible
 A. Perform comparisons specified by constraint equations $f_2 \leq f_{2\,max}$; $f_1+f_2 \leq f_{max}$; $f_1 \leq f_a$
 B. If all constraints satisfied then set controllers to optimum $f_1$ and $f_2$.
 C. If any constraint not satisfied then:
  (1) For $f_a \leq f_{max}$ solve for maximum constrained profit along lines $f_1+f_2=f_{max}$ and $f_2=f_{2\,max}$
  (2) For $f_{max}-f_{2\,max} < f_a < f_{max}$ solve for maximum constrained profit along lines $f_1=f_a$; $f_1+f_2=f_{max}$; and $f_2=f_{2\,max}$
  (3) For $f_a \leq f_{max}-f_{2\,max}$ solve for maximum constrained profit along lines $f_1=f_a$; and $f_2=f_{2\,max}$
 D. Set flow rates $f_1$ and $f_2$ if not previously set to maximum allowable values.

The final computing phase involves the redetermination of constants $k_1$, $k_2$, and $k_3$ from Equation 11. This is accomplished by performing successive divisions of measured $x_3/x_1$ or by computing $x_3$ according to Equation 12 and then dividing by measured $x_1$. The values of $f_1$ and $f_2$ are set during this phase to provide a good correlation between $c$ and these values.

The curve fitting computation may be performed on the basis of the solution of three simultaneous equations corresponding to the three derivative functions of Equation 11 as follows:

$$dD/dk_1 = 0 \quad (11a)$$
$$dD/dk_2 = 0 \quad (11b)$$
$$dD/dk_3 = 0 \quad (11c)$$

Equation 11a, for example, appears as follows when expanded:

$$0 = 2\left(c_1 - \frac{k_2 f_{21}}{1+k_3 f_{21}} e^{-k_1 t_{11}}\right)\cdot\left(\frac{f_{11} k_2 f_{21}}{1+k_3 f_{21}}\right) + \cdots$$
$$2\left(c_{20} - \frac{k_2 f_{2_{20}}}{1+k_3 f_{2_{20}}} e^{-k_1 t_{20}}\right)\cdot\left(\frac{f_{1_2} k_2 f_{2_{20}}}{1+k_3 f_{2_{20}}}\right)$$

The other derivatives may be derived in a similar manner. The actual computation sequence may follow lines discussed above by employing trial values until all equations check.

From the foregoing description it should now be apparent that the present invention provides a novel method for controlling a process to maximize the profit which may be obtained from the products produced thereby. The particular type of computing apparatus which may be employed to carry out the process of the invention has not been specified since many of the standard digital computers now available are suitable. It may be desirable, moreover, to provide a special-purpose digital computer for solving the equations of a particular program or to develop specialized analogue computing circuits. Such techniques are contemplated by the present invention as defined by the claims.

We claim:
1. A system for producing a product as a composition of raw material including at least one catalyst, said system comprising: a first transducer for sensing the flow of raw material and producing a signal $f_a$ indicating the total feed available for producing said product; an analyzer for detecting the percentage of active ingredients in said flow of raw material and for producing a signal representative thereof; a reactor for receiving said raw materials and said catalyst to perform a first chemical operation; a second transducer introduced into the raw material flow for said reactor for producing a signal $f_1$ indicating the flow of material through said reactor; a third transducer for sensing the flow of said catalyst into said reactor and for producing a corresponding flow signal $f_2$; a control computer; means for producing signals representing the value and costs of raw material and products per unit flow; means for coupling the signals produced by said transducers and analyzer, and said signals representing value and costs to said computer, said computer including means operable to produce control signals which specify the proper setting for the flow of material and catalyst to yield a maximum profit.

2. The system defined in claim 1 wherein means are included operating said control computer to produce control signals to regulate the flow corresponding to signals $f_1$ and $f_2$ to maximize profit P in the following equation $$P = f_1 c x_1 (V_3 - V_1) - f_1 (V_a - V_1) - f_2 V_2 - C$$

where $x_1$ is percentage of reactant in raw material at input
$c = x_3/x_1$
$x_3$ = weight percentage of desired product at output of system
$V_3$ = value of desired product
$V_1$ = value of material at output which is not product
$V_a$ = value of raw material not processed
$V_2$ = loss in value of catalyst
$C$ = constant operating costs 3. The system defined in claim 2 wherein means are included operating said control computer during a second computing phase to check the constraints $$f_1+f_2 \leq f_{max}; \quad f_2 \leq f_{2max}; \quad f_1 \leq f_a$$

where $f_{max}$ represents the maximum flow rate through said reactor
$f_{2max}$ represents the maximum rate of flow of said catalyst
$f_a$ represents the total raw material feed rate other than catalyst.

4. In combination with apparatus operating to produce a product from a non-uniformly available and non-homogeneous raw material by causing said raw material to be acted upon by a plurality of conditions including at least one selectively variable condition, means for varying said variable condition to maximize the profit obtainable from said product, said means comprising:
- first transducing means for generating a first signal indicating the flow rate of available raw material;
- second analyzing means for generating a second signal indicating the percentage of active ingredients in said raw material;
- third means for generating a third signal indicating the value and costs of said product and raw material;
- digital control means programmed to determine on the basis of said first, second, and third signals, a set point for said variable condition effective to maximize said profit;
- fourth means for generating a fourth signal indicating said set point; and means responsive to said fourth signal for selectively varying said variable condition to establish said set point.

5. The combination of claim 4 wherein said variable condition comprises the flow rate of catalyst to be mixed with said raw material.

References Cited in the file of this patent

UNITED STATES PATENTS

| | | |
|---|---|---|
| 2,712,414 | Ziebolz et al. | June 5, 1955 |
| 2,836,730 | Early | May 27, 1958 |
| 2,881,235 | Pool | Apr. 7, 1959 |
| 3,002,818 | Berger | Oct. 3, 1961 |
| 3,005,411 | Metz | Oct. 24, 1961 |
| 3,005,911 | Burhans | Oct. 24, 1961 |

OTHER REFERENCES

Taylor C. H. Jr.: "A Coordinated Data-Processing System and an Analog Computer To Define Refinery-Process Operating Guides," Proceedings from the Eastern Computer Conference, December 1957.

Chemical Engineering (Freilich), June 1957, pages 280–284.

Oil and Gas Journal (Farrar), Feb. 18, 1957, pages 121–136.